2,967,666

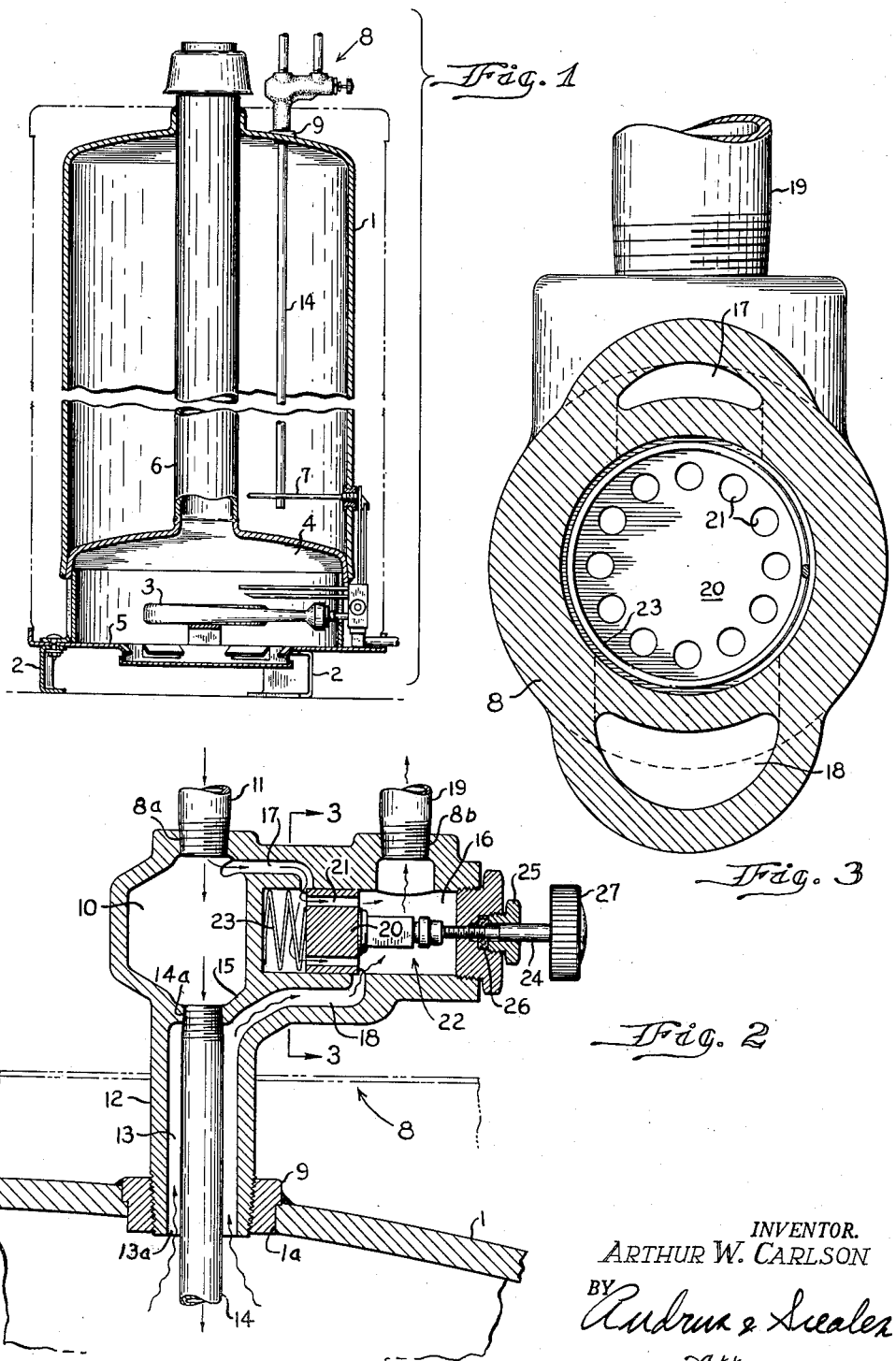
Jan. 10, 1961     A. W. CARLSON     2,967,666
COMBINATION MIXING VALVE AND FITTING FOR WATER HEATER
Filed April 5, 1956
INVENTOR.
ARTHUR W. CARLSON United States Patent Office 2,967,666
Patented Jan. 10, 1961

COMBINATION MIXING VALVE AND FITTING FOR WATER HEATER

Arthur W. Carlson, Kankakee, Ill., assignor to A. O. Smith Corporation, Milwaukee, Wis., a corporation of New York Filed Apr. 5, 1956, Ser. No. 576,416

3 Claims. (Cl. 236—12)

This invention relates to a combination mixing valve and fitting for hot water heaters.

The heating of the water in a hot water tank is controlled by a thermostat which is connected to the heating unit and is responsive to the temperature of the water in the tank. In a gas fired hot water heater, the combustion gases pass upwardly through a flue which is located either centrally of the tank or adjacent the outer surface of the tank. In either case, heat is transferred from the flue gases to the water in the tank so that the portion of the water in the tank that is located above the level of the thermostat is heated to a temperature above that of the thermostat setting. This situation occurs particularly where small intermittent draws of hot water are made. On drawing of the hot water, cold water is introduced into the tank to replace the drawn hot water and the cold water will actuate the thermostat, which is generally located at the bottom of the tank, to heat the water to the temperature setting of the thermostat. However, the heated water in the tank, which is located above the level of the thermostat, will be heated above the thermostat setting by the flue gases as they pass upwardly through the flue.

While the temperature setting of a thermostat in a domestic water heater may be in the range of 140° F. to 160° F., the water in the upper portion of the tank may be heated to a temperature approaching 200° F. As the hot water stratifies in layers, the hottest water at the top of the tank is drawn initially, and if this water is at a temperature approaching 200° F., there is a distinct possibility of scalding through its use. In addition, the use of 200° F. water is a waste of hot water, for water at this temperature is generally too hot for normal domestic use.

The present invention is directed to a combination fitting and mixing valve for a water heater in which cold water can be mixed with the hot water being drawn from the tank to maintain the temperature of the hot water at or below a given temperature setting.

More specifically, the single fitting of the invention is provided with an inlet through which cold water is introduced into the tank, an outlet through which hot water is drawn from the tank, and a mixing chamber which communicates with the outlet. In addition, a by-pass conduit in the fitting connects the inlet with the mixing chamber.

A thermostat valve is located in the mixing chamber and is responsive to the temperature of the water. The valve is adapted to control the amount of hot water and cold water entering the mixing chamber and proportions cold water with the hot water to maintain the temperature of the hot water at or below a predetermined value.

The drawing illustrates the best mode presently contemplated of carrying out the invention.

In the drawing:

Figure 1 is a vertical section of a water heater employing the present invention;

Fig. 2 is an enlarged fragmentary vertical section showing the construction of the fitting; and Fig. 3 is a transverse section taken along lines 3—3 of Fig. 2.

The drawing illustrates a tank 1 or other container which is supported above the floor by a plurality of legs 2. Tank 1 is adapted to contain a liquid such as water to be heated and the interior surfaces of the tank 1 may be coated with a corrosion-resistant lining, such as glass, to protect the tank against corrosion by the contained liquid.

The water within the tank is heated by a gas burner 3 which is disposed within the compartment 4 defined by the lower head of the tank and the bottom plate 5. The combustion gases are conducted upwardly through the tank through a flue 6 which is disposed centrally of the tank and is secured by welding to the upper and lower heads of the tank.

A conventional thermostat unit 7 is disposed within an opening in the tank wall in contact with the water contained within the tank and is adapted to actuate the burner 3 in accordance with the demand for heat by the water.

In a water heater, and particularly a gas fired water heater, the water in the upper portions of the tank is sometimes heated above the temperature setting of the thermostat due to the heat transfer from the combustion gases within the flue to the water in the tank. This excessively hot water, when drawn from the tank, is apt to cause scalding and, in addition, is an uneconomical use of hot water.

In order to obtain a uniform discharge temperature of heated water, the present invention provides a combination mixing valve and an inlet-outlet fitting 8 or housing which is threadedly engaged within a spud 9. The spud 9 is welded within a suitable opening or aperture 1a in the upper head of tank 1.

The upper portion of the fitting 8 defines an inlet chamber 10 and cold water is introduced to the inlet chamber through a pipe 11 which is threadedly engaged within an opening 8a in the wall of the fitting. The lower tubular portion 12 of fitting 8 is threadedly engaged in spud 9 and defines an outlet passage or chamber 13 which is located beneath the inlet chamber 10. The lower end of the passage 13 comprises an opening 13a disposed in communication with the tank 1 and hot water from the tank is withdrawn through the opening 13a.

Cold water is conducted from the inlet chamber 10 to the interior of the tank 1 by a dip tube 14 which is secured within an opening in the interior wall 15 separating the inlet chamber 10 and the passage 13. As shown in the drawing, the upper end 14a of the dip tube 14 is threadedly engaged within the opening in the wall 15. However, the dip tube may be provided with a flared upper end or shoulder which rests on the portion of the wall 15 surrounding the opening. Cold water entering chamber 10 through pipe 11 is conducted downwardly through dip tube 14 to the bottom portion of the tank 1.

The dip tube 14 is spaced inwardly from the walls of the tubular portion 12 so that hot water from the upper portion of the tank can be withdrawn through the passage 13.

To obtain a uniform temperature for the hot water withdrawn from the tank, the fitting 8 is provided with a mixing chamber 16 where a proportioned amount of cold water can be mixed with hot water to obtain a uniform hot water temperature.

Cold water from inlet chamber 10 is conducted to the inner end portion of mixing chamber 16 through passage 17, and hot water from passage 13 is conducted to the central portion of the mixing chamber through a passage 18. Hot water having a uniform temperature is discharged from the mixing chamber 16 through an outlet pipe 19 which is threadedly engaged within a discharge opening 8b in the wall of the fitting 8.

The temperature of the water discharged through outlet 19 is controlled by a slide valve 20 which is slidably disposed within the mixing chamber 16. The slide valve 20 is provided with a length such that the inner end of the valve can be positioned to restrict the flow of cold water entering chamber 16 through passage 17, while the outer end portion of the valve can be positioned to restrict the flow of hot water passing through passage 18 to the mixing chamber.

Cold water is permitted to pass from the inner end of the mixing chamber to the outer end by providing the slide valve with a plurality of circumferentially spaced passages 21.

The position of slide valve 20 within the mixing chamber 16 is controlled by a thermostat element, indicated generally by 22. The element 22 may be of any conventional type, such as a Vernatherm unit which is a fluid type thermostat consisting of a wax base, such as paraffin impregnated with metal powder. The thermostat element 22 is responsive to the temperature of the water within the mixing chamber. As the temperature of the water within the mixing chamber 16 decreases, the thermostat element 22 moves the slide valve 20 inwardly to increase the restriction of passage 17 and correspondingly open the passage 18 to a greater extent and thereby increase the proportion of hot water entering the mixing chamber.

The slide valve 20 is urged outwardly within the mixing chamber by a coil spring 23 which is interposed between the valve and the inner wall of the chamber. As the water temperature in chamber 16 increases, the thermostat element 22 will contract and the coil spring 23 will urge the valve outwardly to take up the contraction of the element and permit a greater amount of cold water to flow into chamber 16 and restrict the flow of hot water thereto.

The temperature setting of the thermostat element 22 can be varied by means of a set screw 24 which is threadedly engaged within a plug 25 enclosing the end of the mixing chamber 16. A suitable packing 26 is employed around the set screw 24 to prevent leakage of fluid through the plug. The inner end of the set screw 24 bears against the thermostat element and by threaded adjustment of set screw 24 through operation of hand knob 27, the pressure on the thermostat element 22 can be varied and thus the temperature setting can be changed.

In operation of the present apparatus, as hot water is drawn from the outlet 19, cold water enters the inlet chamber 10 through pipe 11 and passes through dip tube 14 into the tank 1.

If the temperature of the hot water entering chamber 16 is above the temperature setting of element 22, cold water will be by-passed through passage 17 to chamber 16 and mixed with the hot water to obtain the desired temperature. The mixed water, at the desired temperature, passes outwardly through the outlet 19.

The present invention provides a simple and inexpensive fitting for introducing cold water into a water heater and withdrawing heated water at a constant or uniform temperature.

By having a single fitting which combines the inlet and outlet, an opening in the tank 1 is eliminated. The elimination of an opening and the consequent elimination of a second fitting reduces the corrosion problem in the tank due to the fact that the amount of exposed metal area in the tank to be protected from corrosion is decreased.

By maintaining a uniform temperature hot water, the danger of burning or scalding by overheated water is eliminated. In addition, the higher temperature hot water is mixed with cold water and this provides a more economical use of the hot water for it eliminates the waste of the high temperature hot water.

Various modes of carrying out the invention are contemplated as being within the scope of the following claims particularly pointing out and distinctly claiming the subject matter which is regarded as the invention.

I claim:

1. In a water heater, the combination of a tank to contain water to be heated and having a single water conducting aperture therein, a fitting including an outer tubular member secured within said aperture and having a first opening disposed in communication with the interior of the tank and having a second opening disposed in communication with a source of cold water, said tubular member having a discharge opening disposed to discharge heated water at an intermediate temperature, said fitting also including an inner tubular member disposed within the outer tubular member with one end of said inner tubular member disposed in communication with said second opening and the other end of said inner tubular member extending through the first opening and into the interior of the tank to thereby conduct cold water to the tank, said inner tubular member being of a smaller cross sectional area than the outer tubular member to provide a passage therebetween, conduit means providing communication between said passage and said discharge opening and serving to conduct hot water from the tank to said discharge opening, second conduit means connecting the inner tubular member directly with said discharge opening for conducting a portion of the cold water directly to said discharge opening to thereby obtain a mixing of hot and cold water at an intermediate temperature, and thermostatic valve means disposed adjacent to said discharge opening to control the flow of hot and cold water through said first and second conduit means, respectively, to thereby regulate the temperature of said intermediate water.

2. A fitting to be connected to a single aperture in a tank containing hot water or the like, comprising a housing adapted to be secured within the opening of the tank and having a first opening adapted to communicate with the interior of the tank and having a second opening adapted to communicate with a source of cold water, said housing having a discharge opening adapted to discharge heated water from the housing at an intermediate temperature, cold water conduit means disposed within the housing with one end of said cold water conduit means communicating with said second opening and the other end of said conduit means extending through said first opening and adapted to extend within the tank, said cold water conduit means being spaced inwardly of the housing to provide an annular passage therebetween with said passage providing communication between the first opening and said discharge opening and serving to conduct hot water from the tank to said discharge opening, by-pass conduit means connecting said cold water conduit means and the discharge opening and serving to conduct a portion of the cold water directly to said discharge opening, and a thermostatic valve member disposed adjacent to said discharge opening for controlling the flow of water to said discharge opening and thereby regulating the temperature of the intermediate water.

3. A fitting to be connected to a single aperture in a tank containing hot water or the like, comprising a housing adapted to be secured within the aperture in the tank and having a first opening adapted to communicate with the interior of the tank and having a second opening adapted to communicate with a source of cold water, said housing having a third opening adapted to discharge heated water at an intermediate temperature, a dip tube disposed within the housing with one end of said dip tube communicating with said second opening and the other end of said dip tube extending through said first opening and adapted to extend within the tank, said dip tube being spaced radially inward of the housing to provide an annular passage therebetween with said passage providing communication between said first opening and said third opening to thereby conduct hot water from the tank to the third opening, thermostatic valve means disposed in the passage for controlling the flow of water to said third opening, and by-pass conduit means connecting said dip tube and said valve means and serving to conduct a portion of the cold water directly to the valve means for mixing with the hot water to obtain water of an intermediate temperature.

References Cited in the file of this patent

UNITED STATES PATENTS

| | | |
|---|---|---|
| 966,532 | Deasy | Aug. 9, 1910 |
| 1,471,784 | Engelhard et al. | Oct. 23, 1923 |
| 1,863,273 | Hofferbert | June 14, 1932 |
| 1,891,926 | Hall | Dec. 27, 1932 |
| 1,962,214 | Russell et al. | June 12, 1934 |
| 1,985,929 | Jorgensen et al. | Jan. 1, 1935 |
| 2,628,597 | Rostek | Feb. 17, 1953 |
| 2,652,358 | McFerran | Sept. 15, 1953 |
| 2,684,054 | Carson | July 20, 1954 |
| 2,764,427 | Andrus | Sept. 25, 1956 |
| 2,803,409 | Austin | Aug. 20, 1957 |

FOREIGN PATENTS

| | | |
|---|---|---|
| 414,512 | Great Britain | Aug. 9, 1934 |